(12) United States Patent
Kanno et al.

(10) Patent No.: US 9,947,944 B2
(45) Date of Patent: Apr. 17, 2018

(54) FRAME BODY, CELL FRAME FOR REDOX FLOW BATTERY, AND REDOX FLOW BATTERY

(71) Applicant: Sumitomo Electric Industries, Ltd., Osaka-shi (JP)

(72) Inventors: Takashi Kanno, Osaka (JP); Takeshi Yamana, Osaka (JP); Kenji Motoi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/117,616

(22) PCT Filed: Aug. 21, 2015

(86) PCT No.: PCT/JP2015/073600
§ 371 (c)(1),
(2) Date: Aug. 9, 2016

(87) PCT Pub. No.: WO2017/033237
PCT Pub. Date: Mar. 2, 2017

(65) Prior Publication Data
US 2017/0263951 A1    Sep. 14, 2017

(51) Int. Cl.
*H01M 8/0273* (2016.01)
*H01M 8/18* (2006.01)
(Continued)

(52) U.S. Cl.
CPC ......... *H01M 8/0273* (2013.01); *H01M 8/188* (2013.01); *H01M 8/0202* (2013.01);
(Continued)

(58) Field of Classification Search
CPC .................. H01M 8/04283; H01M 8/2455
See application file for complete search history.

(56) References Cited

U.S. PATENT DOCUMENTS

| 4,772,372 A | 9/1988 | Bruns et al. |
| 2012/0208061 A1 | 8/2012 | Sahu et al. |

(Continued)

FOREIGN PATENT DOCUMENTS

| JP | 2002-246061 A | 8/2002 | |
| JP | 2004-319341 | * 11/2004 | ............. H01M 8/18 |

(Continued)

OTHER PUBLICATIONS

International Search Report in International Application No. PCT/JP2015/073600, dated Nov. 24, 2015.
(Continued)

*Primary Examiner* — Jeremiah R Smith
(74) *Attorney, Agent, or Firm* — Venable LLP; Michael A. Sartori; Laura G. Remus

(57) ABSTRACT

There is provided a frame body used for a cell of a redox flow battery, that can improve heat dissipation of an electrolyte in a slit while reducing a shunt current loss through the electrolyte, and can also suppress strain caused at a slit formation portion. It is a frame body used for a cell of a redox flow battery, comprising: an opening formed inside the frame body; a manifold allowing an electrolyte to pass therethrough; and a slit which connects the manifold and the opening and forms a channel of the electrolyte between the manifold and the opening, the slit having at least one bent portion, the at least one bent portion having a radius of curvature of 2.0 mm or more and 200 mm or less.

7 Claims, 8 Drawing Sheets

(51) Int. Cl.
  *H01M 8/04276* (2016.01)
  *H01M 8/20* (2006.01)
  *H01M 8/2465* (2016.01)
  *H01M 8/0202* (2016.01)

(52) U.S. Cl.
  CPC .......... *H01M 8/04283* (2013.01); *H01M 8/20* (2013.01); *H01M 8/2465* (2013.01); *Y02E 60/528* (2013.01)

(56) References Cited

U.S. PATENT DOCUMENTS

| | | | |
|---|---|---|---|
| 2014/0162095 A1* | 6/2014 | Coad | H01M 2/40 429/81 |
| 2014/0255734 A1 | 9/2014 | Tennessee et al. | |
| 2014/0255815 A1 | 9/2014 | Yano et al. | |

FOREIGN PATENT DOCUMENTS

| | | |
|---|---|---|
| JP | 2013-080613 A | 5/2013 |
| WO | WO-2013/051412 A1 | 4/2013 |

OTHER PUBLICATIONS

Written Opinion of the International Searching Authority in International Application No. PCT/JP2015/073600, dated Nov. 24, 2015.
Patent Examination Report No. 1 in Australian Patent Application No. 2015381016, dated Aug. 19, 2016.

* cited by examiner

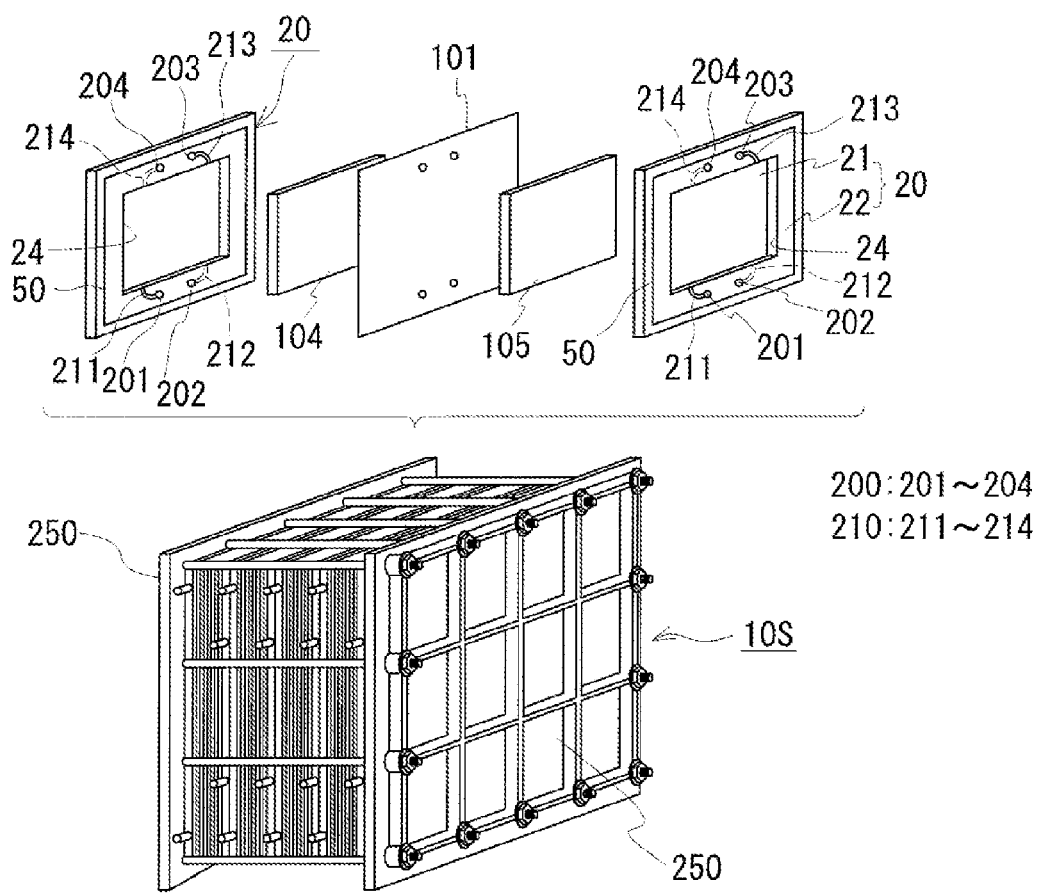

1

FRAME BODY, CELL FRAME FOR REDOX FLOW BATTERY, AND REDOX FLOW BATTERY

TECHNICAL FIELD

The present invention relates to a frame body used for a cell of a redox flow battery, a cell frame for a redox flow battery, and a redox flow battery. More specifically, the present invention relates to a frame body of a cell for a redox flow battery, that can improve heat dissipation of an electrolyte in a slit provided in the frame body, while reducing a shunt current loss through the electrolyte, and can also suppress strain caused at a slit formation portion.

BACKGROUND ART

As one large-capacity storage battery, a redox flow battery (hereafter also referred to as an "RF battery") is known (see patent documents 1 and 2). Referred to as applications of the redox flow battery are load leveling, as well as momentary drop compensation and backup power supply, and smoothing an output of natural energy such as solar power generation, wind power generation and the like whose massive introduction is prompted.

An RF battery is a battery which performs charging and discharging using as a positive electrode electrolyte and a negative electrode electrolyte an electrolyte containing a metal ion (an active material) having a valence varying by oxidation-reduction. FIG. 9 shows a principle of an operation of a vanadium-based RF battery 300 which uses as a positive electrode electrolyte and a negative electrode electrolyte a vanadium electrolyte containing a V ion serving as an active material. In FIG. 9 a solid line arrow and a broken line arrow in a battery cell 100 indicate a charging reaction and a discharging reaction, respectively.

RF battery 300 includes cell 100 separated into a positive electrode cell 102 and a negative electrode cell 103 by an ion exchange film 101 which permeates hydrogen ions. Positive electrode cell 102 has a positive electrode 104 incorporated therein, and a tank 106 provided for the positive electrode electrolyte and storing the positive electrode electrolyte is connected via conduits 108, 110 to positive electrode cell 102. Negative electrode cell 103 has a negative electrode 105 incorporated therein, and a tank 107 provided for the negative electrode electrolyte and storing the negative electrode electrolyte is connected via conduits 109, 111 to negative electrode cell 103. And by pumps 112, 113, the electrolyte stored in each tank 106, 107 is circulated and thus passed through cell 100 (positive electrode cell 102 and negative electrode cell 103) to perform charging and discharging.

In RF battery 300, normally, a configuration including a cell stack having a plurality of cells 100 stacked in layers is utilized. FIG. 10 is a schematic configuration diagram of a cell stack. A cell stack 10S illustrated in FIG. 10 is formed such that it is composed of a cell frame 20 including a frame body 22 in the form of a rectangular frame and a bipolar plate 21 provided inside frame body 22, positive electrode 104, ion exchange membrane 101, and negative electrode 105, each stacked in a plurality of layers, and this stack is sandwiched and thus clamped by two end plates 250. Frame body 22 has an opening formed thereinside, and cell frame 20 is such that a recess is formed inside frame body 22 by fitting bipolar plate 21 in the opening of frame body 22. Specifically, cell frame 20 has a recess (a chamber) 24 formed inside frame body 22 by an inner peripheral surface of frame body 22 and a surface of bipolar plate 21, and positive electrode 104 is disposed at one surface side of bipolar plate 21 and negative electrode 105 is disposed at the other surface side of bipolar plate 21. Frame body 22 shown in FIG. 10 by way of example is in the form of a rectangular frame composed of a pair of opposite, upper and lower long pieces 22L and a pair of right and left short pieces 22S which connect the ends of long pieces 22L. In chamber 24 formed inside frame body 22, electrodes (positive electrode 104 or negative electrode 105) are accommodated, and an internal space of chamber 24 surrounded by bipolar plate 21, frame body 22, and ion exchange membrane 101 configures a cell (a positive electrode cell or a negative electrode cell). In the above cell stack 10S, as shown in FIG. 10, a single cell (a unit cell) 100 will be formed by disposing a pair of positive and negative electrodes 104, 105 between adjacent cell frames 20 with ion exchange membrane 101 interposed between the electrodes.

In cell stack 10S, an electrolyte is passed by a manifold 200 formed in and penetrating frame body 22, and a slit 210 formed on a surface of frame body 22 and providing connection between manifold 200 and chamber 24. Slit 210 has one end connected to manifold 200 and the other end connected to chamber 24. In cell stack 10S illustrated in FIG. 10, the positive electrode electrolyte is supplied from a liquid supply manifold 201 via a liquid supply slit 211 that is formed in one surface side (corresponding to the front side of the sheet of the drawing) of frame body 22 to chamber 24 having positive electrode 104 accommodated therein, passes through chamber 24, and is drained via a liquid drainage slit 213 to a liquid drainage manifold 203. Similarly, the negative electrode electrolyte is supplied from a liquid supply manifold 202 via a liquid supply slit 212 that is formed in the other surface side (corresponding to the back side of the sheet of the drawing) of frame body 22 to the chamber having negative electrode 105 accommodated therein, and is drained via a liquid drainage slit 214 to a liquid drainage manifold 204. Between cell frames 20, in order to suppress leakage of the electrolyte, a looped seal member 50, such as an O ring and a flat gasket, is disposed along an outer perimeter of frame body 22.

CITATION LIST

Patent Documents

PTD 1: Japanese Patent Laying-Open No. 2013-080613
PTD 2: Japanese Patent Laying-Open No. 2002-246061

SUMMARY OF INVENTION

Technical Problem

In the RF battery, when the slit is filled with an electrolyte in a charged state, a shunt current flows via the electrolyte in the slit, and a loss by the shunt current (a shunt current loss) is caused. One means which reduces this shunt current is to increase the length of the slit serving as the channel of the electrolyte to increase the electric resistance of the electrolyte in the slit. Accordingly, conventionally, from a viewpoint of reducing a shunt current loss, there is a case in which a means is taken to provide a bent portion to a portion of the slit to increase the length of the slit to be longer than a linear slit. "The length of the slit" means a length of the slit as measured along the slit from one end to the other end when the cell frame (or frame body) is seen in plan view.

Providing the slit with a bent portion to increase the slit in length, however, has a limit, and when the RF battery is in operation, stands by or the like, i.e., when the slit is filled with the electrolyte, a shunt current will flow through the electrolyte to no small extent. This shunt current may result in the electrolyte generating heat and having an increased temperature. In particular, when the RF battery stands by, the electrolyte stays in the slit, and accordingly, the temperature of the electrolyte within the slit increases more easily than in an operation when the electrolyte is passed. When the temperature of the electrolyte is increased, a precipitate may be produced in the electrolyte and there is a possibility of inviting reduction in battery performance such as degradation of the electrolyte. Furthermore, when the temperature of the electrolyte is increased, its heat may soften and deform the frame body and thus damage the frame body (or the cell frame). Accordingly, in order to suppress rise of the temperature of the electrolyte in the slit, there is a demand for improved heat dissipation of the electrolyte.

Furthermore, in the frame body of the cell for the RF battery, when the electrolyte flows, fluid pressure, thermal expansion and the like are caused, which results in a tensile stress acting on a piece which is a constituent of the frame body in a longitudinal direction, a widthwise direction, and the like, and this stress causes strain. In particular, the frame body's slit formation portion has a small thickness and is accordingly susceptible to strain, and furthermore, stress concentration easily arises at a corner of the slit's cross section or the like, and when an excessive stress acts, cracking is easily caused with the slit serving as a starting point. Accordingly, suppressing strain caused at the slit formation portion is desired. The "slit's cross section" means a cross section orthogonal to a direction in which the electrolyte flows.

Conventionally, in order to reduce a shunt current loss, providing a portion of a slit with a bent portion has been proposed. However, the configuration of the bent portion of the slit has not been necessarily sufficiently examined from a viewpoint of improving heat dissipation of the electrolyte and suppressing strain at the slit formation portion.

The present invention has been made in view of the above circumstances, and one object of the present invention is to provide a frame body of a cell for a redox flow battery, that can improve heat dissipation of an electrolyte in a slit, while reducing a shunt current loss through the electrolyte, and can also suppress strain caused at a slit formation portion.

Solution to Problem

A frame body according to one aspect of the present invention is a frame body used for a cell of a redox flow battery, comprising: an opening formed inside the frame body; a manifold through which an electrolyte circulates; and a slit connected between the opening and the manifold, the slit forming a channel for the electrolyte between the opening and the manifold. The slit has at least one bent portion, whose radius of curvature is equal to or greater than 2.0 mm and is smaller than or equal to 200 mm.

A cell frame for a redox flow battery according to one aspect of the present invention comprises: a frame body according to one aspect of the present invention as described above; and a bipolar plate fitted in the opening of the frame body, the frame body and the bipolar plate forming a chamber inside the frame body.

A redox flow battery according to one aspect of the present invention comprises a cell frame for a redox flow battery according to one aspect of the present invention as described above.

Advantageous Effect of Invention

The above frame body can improve heat dissipation of an electrolyte in a slit while reducing a shunt current loss through the electrolyte, and can also suppress strain caused at a slit formation portion. The above cell frame for a redox flow battery, and the redox flow battery can improve heat dissipation of an electrolyte in a slit provided in a frame body configuring a cell, while reducing a shunt current loss through the electrolyte, and can also suppress strain caused at a slit formation portion.

BRIEF DESCRIPTION OF DRAWINGS

FIG. 10 is a schematic configuration diagram of a cell stack.

DESCRIPTION OF EMBODIMENTS

Figure 1:
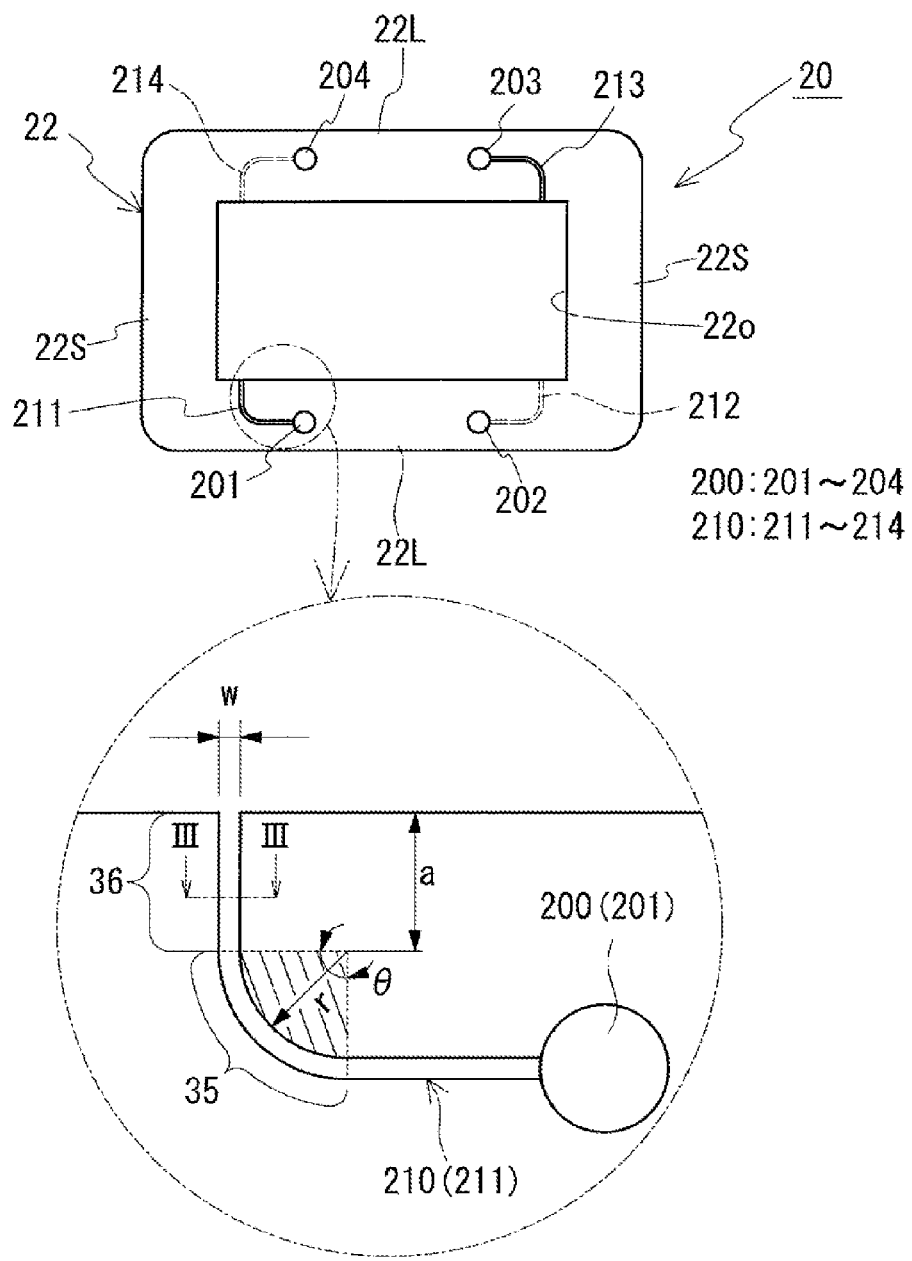
FIG. 1 is a schematic front view of a frame body according to a first embodiment.

Description of Embodiments of the Present Invention

The present inventors have studied for a slit provided on a frame body and having a bent portion a configuration of the bent portion, a radius of curvature thereof in particular, that can improve heat dissipation of an electrolyte in the slit and can also suppress strain caused at a slit formation portion. And the present inventors have obtained the following findings.

When a shunt current causes heat generation and the temperature of the electrolyte in the slit has increased, the electrolyte's heat is dissipated from a wall surface of the slit which the electrolyte contacts, and thus cooled. That is, the heat moves from the electrolyte via the slit's wall surface to the frame body and heat dissipation of the electrolyte is thus performed. When the slit has a bent portion with a small radius of curvature, then in the frame body's plane the bent portion's formation region is small, and it is difficult to dissipate the heat of the electrolyte in the bent portion formation portion to the frame body, and the heat is thus easily confined. More specifically, in the bent portion formation portion of the slit formation portion of the frame body, a formation region surrounded by two line segments which connect the center of the radius of curvature of the bent portion and one and the other ends of the bent portion and by the curved line along the bent portion has a small area (or volume) and has a small heat capacity, and the temperature rapidly increases by heat dissipation from the electrolyte. Accordingly, when the slit has a bent portion with a small radius of curvature, heat dissipation to the frame body from the electrolyte does not proceed sufficiently, and heat is easily confined at the bent portion formation portion. Accordingly, in the bent portion of the slit, the temperature of the electrolyte easily increases, and accordingly, an electrolyte component precipitates, the frame body is softened, or other adverse effects are easily caused.

In contrast, when a frame body having a slit having a bent portion with a large radius of curvature experiences tensile stress resulting from fluid pressure, thermal expansion or the like, a component of a force which acts on the bent portion of the slit in a normal direction (i.e., the slit's widthwise direction) is increased. Specifically, when a stress acts on one direction (e.g., a longitudinal direction) of a piece configuring the frame body, it is decomposed in the bent portion of the slit into a component of a force of the normal direction and a component of a force of a tangential direction. The frame body's slit formation portion is susceptible to strain in response to a force in the slit's widthwise direction, and when the slit has a bent portion with a large radius of curvature the bent portion formation portion is easily strained and thus crackable.

The present inventors have completed the present invention based on the above idea. Initially, embodiments of the present invention will be enumerated and described.

(1) A frame body according to one aspect of the present invention is a frame body used for a cell of a redox flow battery, comprising: an opening formed inside the frame body; a manifold through which an electrolyte circulates; and a slit connected between the opening and the manifold, the slit forming a channel for the electrolyte between the opening and the manifold. The slit has at least one bent portion, whose radius of curvature is equal to or greater than 2.0 mm and is smaller than or equal to 200 mm.

According to the above frame body, as the slit has at least one bent portion, the slit can be larger in length than a linear slit, and a shunt current loss through the electrolyte in the slit can be reduced. Furthermore, the bent portion having a radius of curvature satisfying the above range can improve heat dissipation of the electrolyte in the slit and can also suppress strain caused at a slit formation portion. More specifically, a bent portion having a radius of curvature of 2.0 mm or more allows the bent portion's formation region in the frame body's plane to be large and helps the bent portion formation portion to dissipate the electrolyte's heat to the frame body, and the heat is thus less easily confined. Thus, heat dissipation of the electrolyte can be improved and rise of the temperature of the electrolyte can be suppressed. Accordingly, precipitation of an electrolyte component, softening and deformation of the frame body, and the like, can be suppressed.

In contrast, when a frame body having a bent portion with a large radius of curvature of 200 mm or less experiences tensile stress resulting from fluid pressure, thermal expansion or the like, at the bent portion of the slit a force is dispersed in the normal direction (the slit's widthwise direction) and the tangential direction, and a stress which acts on the bent portion formation portion in the slit's widthwise direction is reduced to be small. Accordingly, strain caused at the slit formation portion can be suppressed and cracking can be suppressed. Preferably, the bent portion has a radius of curvature for example of 10 mm or more and 60 mm or less.

(2) As one aspect of the above frame body, the above slit has a connection portion having a radius of curvature more than 200 mm between the above bent portion that is the closest to the above opening and the above opening.

When the electrolyte is introduced from the manifold into the chamber through the slit, it passes through the bent portion and accordingly experiences centrifugal force (or inertia). This inertia may disturb a flow of the electrolyte introduced into the chamber and thus there is a possibility that the electrolyte in the chamber may have an uneven flow rate profile. According to the above aspect, as a connection portion is provided having a radius of curvature more than 200 mm (i.e., a curvature less than 1/200) between the bent portion the opening serving as the chamber, inertia received when the electrolyte passes through the bent portion can be alleviated and disturbance of a flow of the electrolyte introduced into the chamber can be suppressed. Accordingly, the above connection portion can provide a flow adjustment effect which suppresses disturbance of a flow of the electrolyte introduced into the chamber. This can equalize a flow rate profile of the electrolyte in the chamber.

(3) As the one aspect of the above frame body, the above connection portion has a length of 5.0 mm or more and 200 mm or less.

According to the above aspect, as the connection portion has a length of 5.0 mm or more, disturbance of a flow of the electrolyte introduced into the chamber can be effectively suppressed and a high flow adjustment effect can be obtained. In contrast, when a frame body having a connection portion with a length of 200 mm or less experiences tensile stress resulting from fluid pressure, thermal expansion or the like, a stress which acts on the connection portion of the slit entirely is small. Accordingly, strain caused at the connection portion formation portion can be suppressed and cracking can be suppressed. Preferably, the connection portion has a length for example of 10 mm or more and 50 mm or less.

(4) As one aspect of the above frame body, the above slit has a depth of 0.5 mm or more and 10 mm or less.

The larger the slit's cross section is, the smaller a pressure loss when the electrolyte passes is. According to the above aspect, the slit having a depth of 0.5 mm or more allows the slit with a fixed width to have an increased cross-sectional area and thus allows a reduced pressure loss. Furthermore, when the electrolyte has a fixed flow rate, then the larger the cross-sectional area is, the slower the electrolyte's flow velocity is, and accordingly, centrifugal force when the electrolyte passes through the bent portion is reduced and an improved flow adjustment effect can be achieved. Furthermore, as the slit has a depth of 10 mm or less, reduction in strength resulting from reduced thickness at the slit formation portion of the frame body can be suppressed, and strain, cracking and the like by fluid pressure, thermal expansion and the like can further be suppressed. Furthermore, as the slit has a depth of 10 mm or less, a stress which acts on the slit is reduced, which helps reducing the amount of strain. Preferably, the slit has a depth of 1.0 mm or more and 5.0 mm or less, for example. The slit's depth means a length of the slit, as seen in the slit's cross section, in a perpendicular direction (that is, the frame body's thickness direction) from the opening of the slit to the bottom thereof. The slit's width means a width of the opening in the slit's cross section.

(5) As one aspect of the above frame body, the above slit has a width of 0.5 mm or more and 20 mm or less.

According to the above aspect, the slit having a width of 0.5 mm or more allows the slit with a fixed depth to have an increased cross-sectional area and thus allows a reduced pressure loss. Furthermore, as has been described above, a larger cross-sectional area allows an improved flow adjustment effect. Furthermore, as the slit has a width of 20 mm or less, reduction in strength at the slit formation portion of the frame body can be suppressed, and strain, cracking and the like by fluid pressure, thermal expansion and the like can further be suppressed. Furthermore, as the slit has a width of 20 mm or less, the amount of heat generated by the electrolyte in the slit can be suppressed and rise of the temperature of the electrolyte is easily suppressed. Furthermore, as the slit has a width of 20 mm or less, the frame body's slit formation portion can be small, and the frame body and hence the cell frame can be miniaturized. Preferably, the slit has a width of 1.0 mm or more and 8.0 mm or less, for example.

(6) As one aspect of the above frame body, the frame body has a pair of long pieces opposite to each other and a pair of short pieces which connect the ends of the long pieces, and the long piece is provided with at least one bent portion described above.

When the bent portion of the slit formed in the long piece of the frame body is compared with the bent portion of the slit formed in the short piece of the frame body the former can provide a longer distance from the bent portion to one or the other end of the piece provided with the bent portion (hereafter also referred to as a "bent portion formation piece") than the latter. The longer this distance is, the more material the frame body is formed of in a region from the bent portion to one or the other end of the bent portion formation piece, so that when fluid pressure, thermal expansion and the like result in a stress acting in a longitudinal direction of the bent portion formation piece, strain less easily occurs, and cracking is suppressed. Thus, according to the above aspect, strain, cracking and the like caused at the slit formation portion (the bent portion formation portion in particular) can further be suppressed.

(7) As one aspect of the above frame body, the frame body has a pair of long pieces opposite to each other and a pair of short pieces which connect the ends of the long pieces, and a corner formed by the long piece and the short piece has at least one bent portion described above.

The corner formed by the long piece and the short piece has large strength and is thus resistant to deformation. When the bent portion of the slit is formed at the corner of the frame body, and fluid pressure, thermal expansion and the like result in a stress acting on a piece configuring the frame body, strain less easily occurs, and cracking is suppressed. Thus, according to the above aspect, strain, cracking and the like caused at the slit formation portion (the bent portion formation portion in particular) can further be suppressed.

(8) A cell frame for a redox flow battery according to one aspect of the present invention comprises: the frame body according to any one of items (1) to (7); and a bipolar plate fitted in the opening of the frame body, the frame body and the bipolar plate forming a chamber inside the frame body.

According to the above cell frame, as the above frame body according to one aspect of the present invention is included, in a frame body configuring a cell of a redox flow battery, heat dissipation of an electrolyte in a slit can be improved while a shunt current loss through the electrolyte can be reduced, and strain caused at a slit formation portion can also be suppressed.

(9) A redox flow battery according to one aspect of the present invention comprises a cell frame for a redox flow battery according to the above item (8).

According to the above redox flow battery, as the above cell frame according to one aspect of the present invention is included, in a frame body configuring a cell, heat dissipation of an electrolyte in a slit can be improved while a shunt current loss through the electrolyte can be reduced, and strain caused at a slit formation portion can also be suppressed.

DETAILED DESCRIPTION OF EMBODIMENTS OF THE PRESENT INVENTION

A specific example of a frame body and a cell frame for a redox flow battery according to an embodiment of the present invention will now be described hereafter with reference to the drawings. In the figures, identical reference characters denote identical or corresponding components. Note that the present invention is not limited to these examples, and is intended to include any modifications within the meaning and scope indicated by and equivalent to the terms of the claims.

First Embodiment

<Frame Body>

Figure 2:
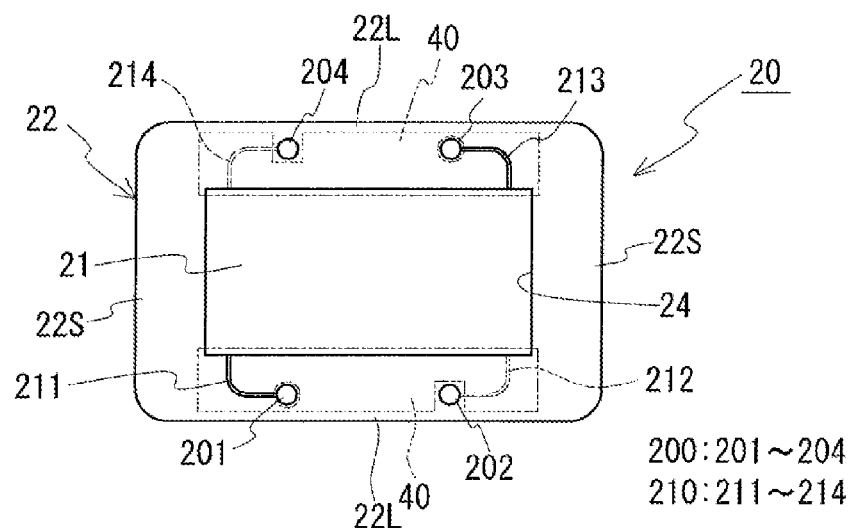
FIG. 2 is a schematic front view of a cell frame including the frame body according to the first embodiment.
Figure 3:
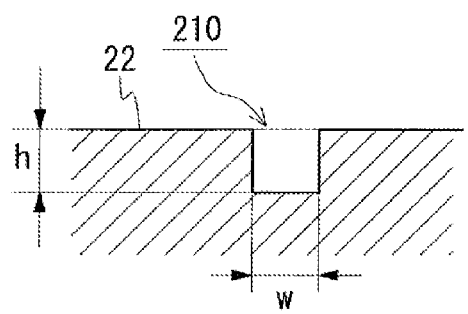
FIG. 3 is a schematic cross section showing a cross sectional shape of a slit in the frame body according to the first embodiment in an enlarged view.

With reference to FIG. 1 to FIG. 3, a frame body and a cell frame according to a first embodiment will be described. FIG. 1 illustrates a frame body 22 which is in the form of a rectangular frame having a pair of long pieces 22L opposite to each other and a pair of short pieces 22S which connect the ends of long pieces 22L, and an opening 22o is formed inside the frame body. A bipolar plate 21 which will be described later is fitted in this opening 22o. Frame body 22 is formed for example of vinyl chloride resin, polypropylene, polyethylene, fluoro-resin, epoxy resin or other similar plastics or rubbers, or the like.

Frame body 22 includes a manifold 200 (manifolds 201-204) which penetrates the front and back sides of the frame body and passes an electrolyte, and a slit 210 (slits 211-214) which is formed on a surface of the frame body and forms a channel between manifold 200 and opening 22o for the electrolyte. Manifold 200 and slit 210 can for example be formed simultaneously with forming frame body 22 by injection molding.

(Manifold and Slit)

Manifolds 201, 202 are formed in frame body 22 at one long piece 22L (in FIG. 1, a lower long piece), and manifolds 203, 204 are formed in frame body 22 at the other long piece 22L (in FIG. 1, an upper long piece). Slits 211, 213 are formed on frame body 22 at one surface side, and slit 211 is formed at one long piece 22L and slit 213 is formed at the other long piece 22L. Slits 212, 214 are formed on frame body 22 at the other surface side and slit 212 is formed at one long piece 22L and slit 214 is formed at the other long piece 22L. Slits 211-214 have their respective one ends connected to manifolds 201-204, respectively, and the other ends connected to opening 22o, and slits 211-214 connect manifolds 201-204, respectively, and opening 22o formed inside frame body 22.

<Cell Frame>

With reference to FIG. 2, a cell frame including the frame body according to the first embodiment shown in FIG. 1 will be described. A cell frame 20 illustrated in FIG. 2 includes frame body 22 and bipolar plate 21 fitted in opening 22o (see FIG. 1) of frame body 22. Cell frame 20 has frame body 22 formed to sandwich a peripheral edge portion of bipolar plate 21 from the front and back sides and frame body 22 is integrated with an outer periphery of bipolar plate 21 by injection molding or the like. By fitting bipolar plate 21 in opening 22o of frame body 22, a recess (a chamber 24) is formed by frame body 22 and bipolar plate 21. Specifically, cell frame 20 has chamber 24 formed inside frame body 22 by an inner peripheral surface of frame body 22 and a surface of bipolar plate 21 to accommodate an electrode (not shown). In FIG. 2, only chamber 24 on one surface side (the front side of the sheet of the figure) of cell frame 20 is shown, however, a chamber is also formed on the other surface side (the back side of the sheet of the figure) of cell frame 20. A positive electrode is accommodated in the chamber on one surface side of cell frame 20 and a negative electrode is accommodated in the chamber on the other surface side of cell frame 20, and the positive electrode is disposed on one surface side of bipolar plate 21 and the negative electrode is disposed on the other surface side of bipolar plate 21 (see FIG. 10). Bipolar plate 21 can be formed of plastic carbon.

For cell frame 20 (frame body 22) illustrated in FIG. 2, manifolds 201 and 203 are a liquid supply manifold and a liquid drainage manifold for a positive electrode electrolyte, and slits 211 and 213 are a liquid supply slit and a liquid drainage slit for the positive electrode electrolyte. Manifolds 202 and 204 are a liquid supply manifold and a liquid drainage manifold for a negative electrode electrolyte, and slits 212 and 214 are a liquid supply slit and a liquid drainage slit for the negative electrode electrolyte. Liquid supply slits 211, 212 extending from liquid supply manifolds 201, 202 are connected to a lower edge portion of chamber 24 (opening 22o (see FIG. 1)), and liquid drainage slits 213, 214 extending from liquid drainage manifolds 203, 204 are connected to an upper edge portion of chamber 24 (opening 22o). That is, the electrolyte is introduced into chamber 24 from a lower side of chamber 24, and the electrolyte is drained from an upper side of chamber 24. A flow adjustment portion (not shown) is formed at the lower and upper edge portions of chamber 24 therealong. The flow adjustment portion has a function which diffuses the electrolyte introduced from liquid supply slits 211, 212, along the lower edge portion of chamber 24, and collects the electrolyte drained from the upper edge portion of chamber 24, to liquid drainage slits 213, 214. By this flow adjustment portion, the electrolyte passes from the lower edge portion of chamber 24 through the interior of chamber 24 toward the upper edge portion of chamber 24.

The positive and negative electrolytes can be a known electrolyte. For example, referred to as the positive and negative electrolytes are a V based electrolyte which contains V ion as an active material for the positive electrode and the negative electrode, a combination of an Fe/Cr based electrolyte which contains Fe ion as a positive electrode active material and Cr ion as a negative electrode active material, a Ti/Mn based electrolyte which contains Mn ion as a positive electrode active material and Ti ion as a negative electrode active material, and the like.

(Protective Plate)

On cell frame 20, at a portion of frame body 22 where slits 211-214 are formed, a protective plate 40 made of plastic and protecting an ion exchange membrane (see FIG. 10) may be disposed. Protective plate 40 is disposed on a surface of long piece 22L of frame body 22 to cover each slit 211-214, and each protective plate 40 has a throughhole or a notch formed at a position corresponding to each manifold 201-204. In the case of protective plate 40 illustrated in FIG. 2, for protective plate 40 disposed at one surface side of frame body 22 at which slits 211, 213 for the positive electrode electrolyte are formed, a circular throughhole is formed for manifolds 201, 203 for the positive electrode electrolyte, whereas a rectangular notch is formed for manifolds 202, 204 for the negative electrode electrolyte. In contrast, for protective plate 40 disposed at the other surface side of frame body 22 at which slits 212, 214 for the negative electrode electrolyte are formed, a rectangular notch is formed for manifolds 201, 203 for the positive electrode electrolyte, whereas a circular throughhole is formed for manifolds 202, 204 for the negative electrode electrolyte. When a cell of a redox flow battery (see FIG. 10) is configured using cell frame 20, this protective plate 40 prevents each slit 211-214 from contacting the ion exchange membrane, and the ion exchange membrane can be prevented from being damaged by the irregularity of the slit. In FIG. 2, only protective plate 40 which covers slits 211, 213 formed at one surface side of frame body 22 is shown, however, there is also a protective plate disposed at the other surface side of frame body 22 to cover slits 212, 214.

(Planar Shape of Slit)

FIG. 1 shows in a circle an enlarged plan view of a slit 210 (211) in the frame body according to the first embodiment. FIG. 1 representatively shows a planar shape of slit 211. Furthermore, FIG. 3 shows a cross sectional shape of slit 210, and it is a schematic enlarged cross section taken along a line shown in the circle in FIG. 1. As shown in FIG. 1, slit 210 has at least one bent portion 35. Hereinafter, with reference to FIGS. 1 and 3, a planar shape of slit 210 of the first embodiment will more specifically be described.

Slit 210 (211) of the first embodiment has a single bent portion 35, and a connection portion 36 between bent portion 35 and opening 22o (chamber 24 in cell frame 20 shown in FIG. 2). More specifically, slit 210 of the first embodiment is formed in the form of an L letter, as shown in FIG. 1, and composed of a linear portion extending from manifold 200 (201) in a longitudinal direction (in FIG. 1, a left direction) of long piece 22L of frame body 22, a bent portion 35 connected with this linear portion, and a connection portion 36 extending in a widthwise direction (a direction which is orthogonal to the longitudinal direction) of long piece 22L.

(Bent Portion)

Bent portion 35 has a radius of curvature r of 2.0 mm or more and 200 mm or less. Slit 210 of the first embodiment shown in FIG. 1 has bent portion 35 which is arcuate and has a central angle θ of substantially a right angle (90 degrees). The central angle of the bent portion means an angle formed by two line segments which connect the center of the radius of curvature of the bent portion and one and the other ends of the bent portion. Bent portion 35 preferably has a radius of curvature r of 10 mm or more and 60 mm or less.

(Connection Portion)

Connection portion 36 has a radius of curvature more than 200 mm (a curvature less than 1/200), and also includes being linear (a curvature of 0). Slit 210 shown in FIG. 1 has connection portion 36 which is linear. Connection portion 36 preferably has a length a of 5.0 mm or more and 200 mm or less, and more preferably 10 mm or more and 50 mm or less.

(Cross Sectional Shape of Slit)

A cross sectional shape of slit 210 is substantially a rectangle, as shown in FIG. 3. The cross sectional shape of slit 210 is not limited to a rectangle, and it may for example be a quadrangle such as an isosceles trapezoid, a triangle such as an isosceles triangle, a semicircle, a semiellipse, or the like. More specifically, the slit's cross section is in the form of a trapezoid with the opening serving as a longer side and the bottom serving as a shorter side, a triangle with the bottom serving as a vertex and the opening serving as a base, or a similar form having a width larger at a side closer to the opening than at a side closer to the bottom. Furthermore, the slit's cross section may have a corner chamfered or formed in a curved surface.

(Depth and Width)

Slit 210 preferably has a depth h for example of 0.5 mm or more and 10 mm or less, and furthermore, 1.0 mm or more and 5.0 mm or less. Slit 210 preferably has a width w for example of 0.5 mm or more and 20 mm or less, and furthermore, 1.0 mm or more and 8.0 mm or less.

(Function and Effect)

Frame body 22 (cell frame 20) according to the first embodiment that has slit 210 having a portion with bent portion 35 can have a longer slit length than a single linear slit and can thus reduce a shunt current loss. Furthermore, bent portion 35 having radius of curvature r of 2.0 mm or more and 200 mm or less can improve heat dissipation of the electrolyte in the slit and suppress strain caused in the slit formation portion. More specifically, bent portion 35 having radius of curvature r of 2.0 mm or more allows bent portion 35's formation region in the plane of frame body 22 (or longer side 22L) (i.e., a region hatched in the figure circled in FIG. 1) to be large and allows bent portion 35's formation portion to have an increased heat capacity. This allows the bent portion formation portion to dissipate an increased amount of heat from the electrolyte and hence be less prone to confine heat. Thus, heat dissipation of the electrolyte can be improved and rise of the temperature of the electrolyte can be suppressed, and accordingly, precipitation of an electrolyte component, softening and deformation of the frame body, and the like, can be suppressed.

In contrast, when frame body 22 having bent portion 35 with radius of curvature r of 200 mm or less experiences tensile stress resulting from fluid pressure, thermal expansion or the like, a component of a force which acts on bent portion 35 of slit 210 in a normal direction (i.e., the slit's widthwise direction) is decreased. Specifically, for frame body 22 shown in FIG. 1, for example when a stress acts in the longitudinal direction of longer side 22L, a force is dispersed in bent portion 35 in the normal direction and the tangential direction, and a stress which acts on the bent portion formation portion (a vicinity of both sides of the slit at bent portion 35) in the slit's widthwise direction is reduced to be small. Accordingly, strain caused at the slit formation portion can be suppressed and cracking can be suppressed.

Furthermore, as slit 210 (liquid supply slit 211) has connection portion 36, inertia received when the electrolyte passes through bent portion 35 can be alleviated and disturbance of a flow of the electrolyte introduced into chamber 24 can be suppressed.

In particular, as connection portion 36 has length a of 5.0 mm or more, disturbance of a flow of the electrolyte introduced into chamber 24 can be effectively suppressed and a high flow adjustment effect can be obtained. Furthermore, with connection portion 36 having length a of 200 mm or less, when tensile stress is exerted, a total stress which acts in a vicinity of both sides of the slit at connection portion 36 can be small. Accordingly, strain caused at connection portion 36's formation portion can be suppressed and cracking can be suppressed.

Furthermore, slit 210 having depth h of 0.5 mm or more allows the slit with width w fixed to have an increased cross-sectional area and thus allows a reduced pressure loss. Furthermore, slit 210 having width w of 0.5 mm or more allows the slit with depth h fixed to have an increased cross-sectional area and thus allows a reduced pressure loss. With the reduced pressure loss, inertia received when the electrolyte passes through bent portion 35 is reduced, which can improve a flow adjustment effect provided by connection portion 36. Furthermore, as slit 210 has depth h of 10 mm or less and width w of 20 mm or less, reduction in strength at the slit formation portion of frame body 22 can be suppressed, and strain, cracking and the like by fluid pressure, thermal expansion and the like can further be suppressed.

Then, based on FIG. 4 and FIG. 5, other examples of planar shapes of slit 210 will be described. Hereinafter, slit 210 will be described such that a configuration similar to the above described first embodiment is identically denoted and will not be described and a point different from the first embodiment will mainly be described.

Second Embodiment

The first embodiment shown in FIG. 1 has been described with reference to an example in which bent portion 35 of slit 210 is formed on frame body 22 at long piece 22L. FIG. 4 shows a second embodiment, in which bent portion 35 is formed at a corner 22C of frame body 22 at which long piece 22L and short piece 22S intersect with each other.

Figure 4:
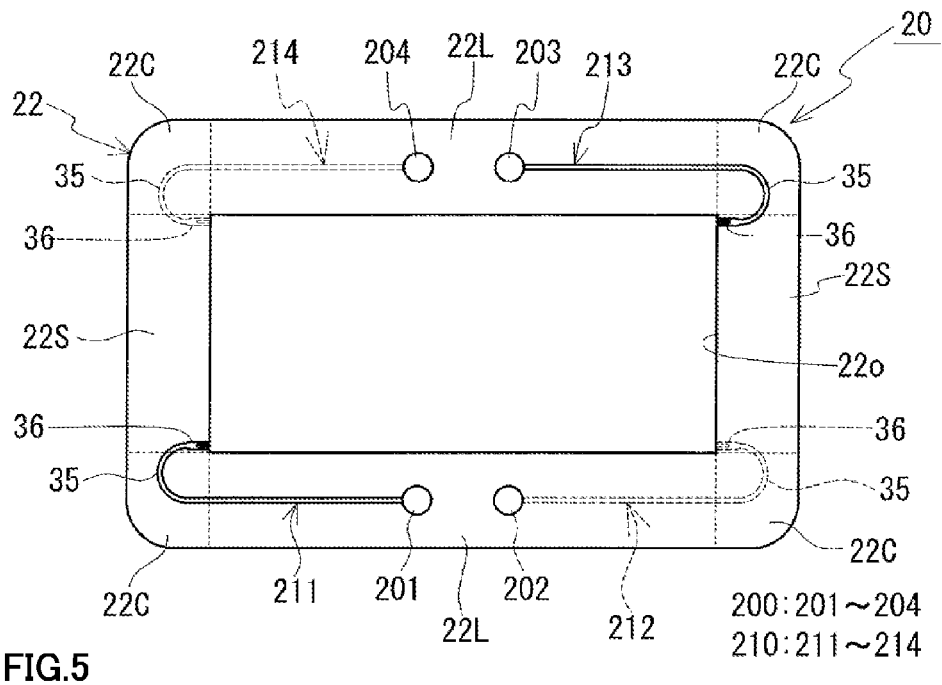
FIG. 4 is a schematic front view of a frame body according to a second embodiment.

Slit 210 of the second embodiment shown in FIG. 4 is formed in the form of a letter J, and bent portion 35 is in the form of a semicircular arc and has a central angle substantially of 180 degrees. Furthermore, in the case of the second embodiment shown in FIG. 4 liquid supply slits 211, 212 each have connection portion 36 connected to opening 22o at a side edge, lower end portion, and liquid drainage slits 213, 214 each have connection portion 36 connected to opening 22o at a side edge, upper end portion.

Corner 22C of frame body 22 is resistant to deformation against tensile stress resulting from fluid pressure, thermal expansion or the like. In the second embodiment, bent portion 35 of slit 210 is formed at corner 22C, and the bent portion formation portion is thus resistant to strain.

Third Embodiment

While the first embodiment shown in FIG. 1 has been described with reference to an example in which slit 210 has a single bent portion 35, a plurality of bent portions 35 may be provided. In a third embodiment shown in FIG. 5 will be described an aspect in which slit 210 has a plurality of bent portions 35.

Figure 5:
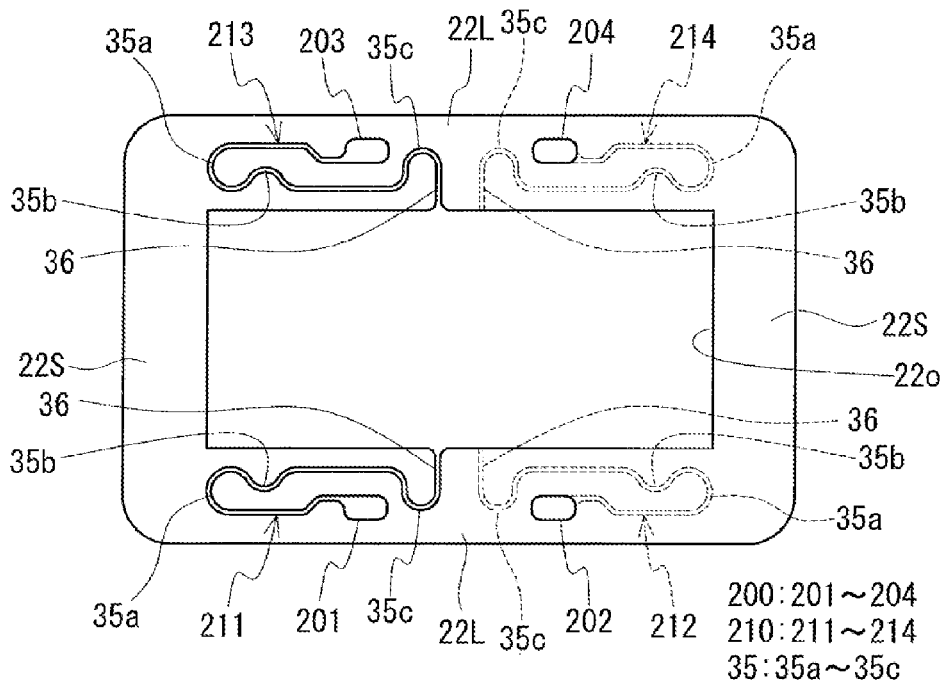
FIG. 5 is a schematic front view of a frame body according to a third embodiment.

Slit 210 of the third embodiment shown in FIG. 5 has a plurality of bent portions 35, and has connection portion 36 between a bent portion 35c of bent portions 35 that is the closest to opening 22o and opening 22o. Slit 210 having the plurality of bent portions 35 can have a longer slit length and allows a further reduced shunt current loss. Bent portion 35 has a center angle for example of 60 degrees or more and 300 degrees or less, and furthermore, 80 degrees or more and 280 degrees or less.

Hereinafter will be described a redox flow battery including a cell frame according to the embodiments described above. When the cell frame is applied to the redox flow battery, it is utilized in a form of a cell stack formed such that it is composed of a cell frame, a positive electrode, an ion exchange membrane, and a negative electrode, each stacked in a plurality of layers (see FIG. 10). And a configuration is referred to in which the redox flow battery includes this cell stack.

[Exemplary Test Calculation 1]

Heat dissipation performance and an amount of strain when the slit had a bent portion varied in radius of curvature, were assessed. Assessment conditions are indicated below.

Figure 6:
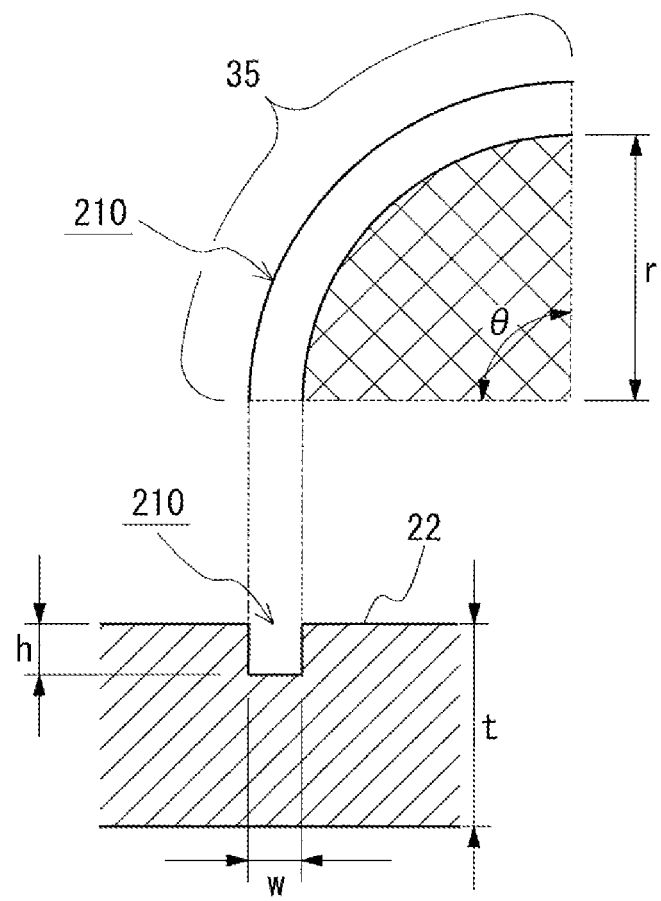
FIG. 6 shows a model of a slit used for an assessment of an exemplary test calculation 1.

In exemplary test calculation 1, a model of slit 210 which has bent portion 35 as shown in FIG. 6 was used to analyze and assess heat dissipation performance and the amount of strain at bent portion 35 when radius of curvature r of bent portion 35 was varied in a range of 1.0 mm to 300 mm. Slit 210 had bent portion 35 with a planar shape of ¼ of an arc (with a central angle θ=90 degrees). Furthermore, slit 210 had a cross sectional shape in the form of a rectangle with depth h of 1 mm and width w of 4 mm.

(Heat Dissipation Performance)

Heat dissipation performance was assessed by a ratio of an amount of heat generated by the electrolyte in bent portion 35 and a heat capacity of bent portion 35's formation portion in frame body 22 (a temperature increase rate ΔT as described later). An amount Q of heat generated by the electrolyte in bent portion 35 and a heat capacity C of bent portion 35's formation portion were obtained as follows:

(Amount of Heat Generated by Electrolyte)

Amount Q of heat generated (W) is obtained from electric resistance R of the electrolyte in bent portion 35 (Ω), and an in-slit voltage v (V). Electric resistance R is calculated, with the electrolyte's resistivity represented as p (Ω·cm), by the following expression:

$$R = \rho \times (\pi r/2) \times (1/wh).$$  [Expression 1]

And amount Q of heat generated is calculated by the following expression:

$$Q = v^2/R = v^2 \times (2wh/\rho \pi r).$$  [Expression 2]

Resistivity ρ used in the above expression is set to 3.82 Ω·cm from the resistivity of a V-based electrolyte used as an electrolyte of an RF battery. In-slit voltage v (V) is set to 10.5 V from a voltage obtained from stacking 30 unit cells of a typical RF battery in layers.

(Heat Capacity of Bent Portion Formation Portion)

Heat capacity C (J/° C.) is obtained from a specific heat capacity Cp (J/cm$^3$·° C.) of frame body 22 and a volume V of the bent portion formation portion (cm$^3$). Specific heat capacity Cp is calculated from a specific heat c (J/kg·° C.) of frame body 22 and a specific gravity d (g/cm$^3$) thereof by the following expression:

$$Cp = c \times d.$$  [Expression 3]

Volume V is a volume of frame body 22 at bent portion 35's formation region (a region crosshatched in FIG. 6), and calculated by the following expression. Frame body 22 has a thickness t of 5 mm for the sake of illustration.

$$V = (\pi r^2/4) \times t$$  [Expression 4]

And heat capacity C is calculated by the following expression:

$$C = Cp \times V = Cp \times (\pi r^2 t/4).$$  [Expression 5]

For specific heat c and specific gravity d used for the above expression, frame body 22 formed of vinyl chloride resin is assumed, and specific heat c is set to 840 J/kg·° C. and specific gravity d is set to 1.4 g/cm$^3$.

(Temperature Increase Rate)

From amount Q of heat generated (W) and heat capacity C (J/° C.) calculated using the above expression, temperature increase rate ΔT (° C./s) is calculated by the following expression:

$$\Delta T = Q/C = (v^2 \times 2wh/\rho \pi r)/(Cp \times (\pi r^2 t/4)) = (v^2 \times 2wh \times 4)/(\rho \pi r \times Cp \times \pi r^2 t) = (8v^2/\rho \pi r^2 Cp) \times (wh/r^3 t).$$  [Expression 6]

<Assessment of Heat Dissipation Performance>

Radius of curvature r of bent portion 35 was varied in a range of 1.0 mm to 300 mm and temperature increase rate ΔT (° C./s) was calculated, and based thereon, heat dissipation performance was assessed. Smaller temperature increase rate ΔT means higher heat dissipation performance. Heat dissipation performance was assessed as "A" for temperature increase rate ΔT having a value of 10 (° C./s) or less, "B" for temperature increase rate ΔT having a value of 500 (° C./s) or less, and "C" otherwise. Values of temperature increase rate ΔT and an assessment of heat dissipation performance are shown in table 1.

(Amount of Strain)

Figure 7:
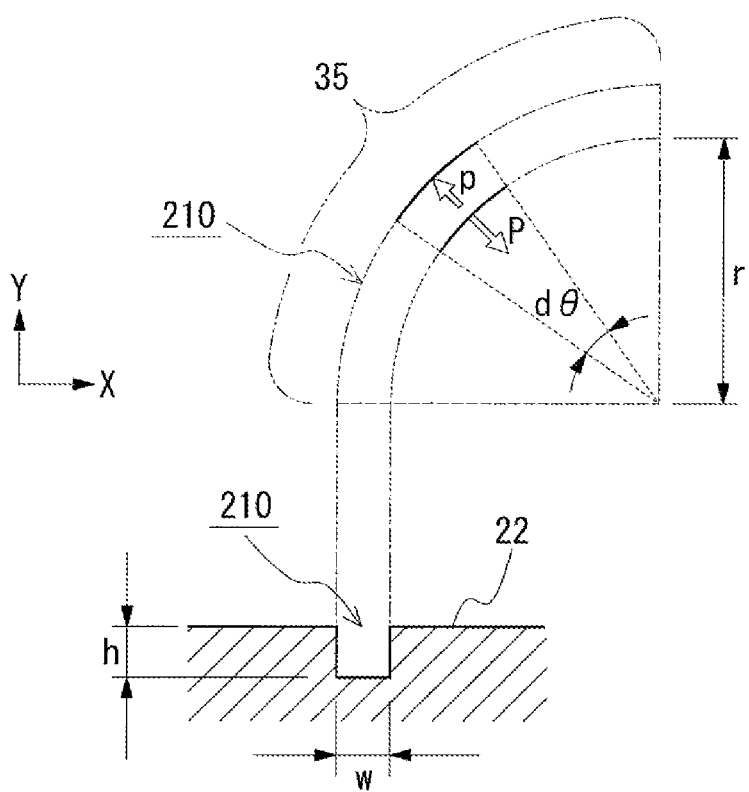
FIG. 7 illustrates a method of calculating an amount of strain of a bent portion in exemplary test calculation 1.

Amount of strain was assessed by a total load P by a fluid pressure applied to bent portion 35's formation portion. Load P (N) is obtained by integrating in a range of 0≤θ≤π/2 a load by a unit fluid pressure p (N/mm) applied to a small section of a central angle dθ of bent portion 35 on the XY plane, as shown in FIG. 7. In that case, when load P is divided into the x direction and the y direction shown in FIG. 7 for consideration, load P can be represented as a product of unit fluid pressure p and radius of curvature r by the following expression:

$$(X \text{ direction}) P = \int (p \times r \cdot \cos \theta d\theta) = p \times r$$

$$(Y \text{ direction}) P = \int (p \times r \cdot \sin \theta d\theta) = p \times r$$  [Expression 7]

Unit fluid pressure p (N/mm) is provided as a product of fluid pressure σ (MPa) and the slit's depth h (mm) by the following expression. Note that fluid pressure σ is set to 0.5 MPa.

$$p = \sigma \times h$$  [Expression 8]

(Load)

By the following expression, load P (N) at bent portion 35 is calculated, and this load P is represented as P$_r$.

$$P = p \times r = \sigma \times h \times r$$  [Expression 9]

<Assessment of Amount of Strain>

Radius of curvature r of bent portion 35 was varied in a range of 1.0 mm to 300 mm and load P$_r$ (N) was calculated, and based thereon, the amount of strain was assessed. A smaller load P$_r$ means a smaller amount of strain at bent portion 35. The amount of strain was assessed as "A" for load P$_r$ having a value of 50 (N) or less, "B" for load P$_r$ having a value of 100 (N) or less, and "C" otherwise. Values of load P$_r$ and an assessment of the amount of strain are shown in table 1.

<Overall Assessment>

Bent portions having radii of curvature shown in table 1 underwent an overall assessment based on an assessment of heat dissipation performance and amount of strain. The overall assessment is as follows: "A" when heat dissipation performance and the amount of strain are both assessed as "A" (or there is no "B" or "C"); "B" when at least one of heat dissipation performance and the amount of strain is assessed as "B" and there is no "C"; and "C" when at least one of heat dissipation performance and the amount of strain is assessed as "C". A result thereof is shown in table 1.

TABLE 1

| radius of curvature of bent portion | | r (mm) | | | | | |
|---|---|---|---|---|---|---|---|
| | | 1.0 | 2.0 | 10 | 60 | 200 | 300 |
| heat dissipation performance | ΔT | 1593 | 199 | 1.6 | $7.4 \times 10^{-3}$ | $2.0 \times 10^{-4}$ | $5.9 \times 10^{-5}$ |
| | assessment | C | B | A | A | A | A |
| amount of strain | P$_r$ | 0.5 | 1 | 5 | 30 | 100 | 150 |
| | assessment | A | A | A | A | B | C |
| overall assessment | | C | B | A | A | B | C |

From the result of exemplary test calculation 1 shown in table 1, it can be seen that a bent portion having a larger radius of curvature r allows temperature increase rate ΔT to have a smaller value and hence allows higher heat dissipation performance, and that a bent portion having a smaller radius of curvature r allows load $P_r$ to have a smaller value and hence allows a smaller amount of strain. And when radius of curvature r is 2.0 mm or more and 200 mm or less, it is believed that improvement of heat dissipation and reduction in amount of strain can be coestablished. In particular, when radius of curvature r is 10 mm or more and 60 mm or less, improvement of heat dissipation and reduction in amount of strain can be coestablished at a high level.

[Exemplary Test Calculation 2]

A flow adjustment effect and an amount of strain when the slit had a connection portion varied in length, were assessed. Assessment conditions are indicated below.

Figure 8:
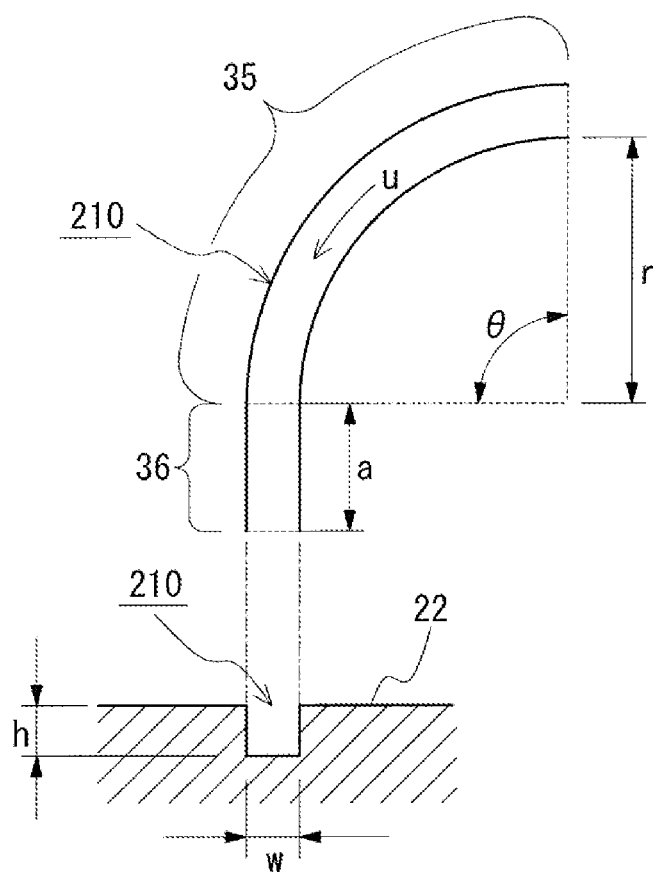
FIG. 8 shows a model of a slit used for an assessment of an exemplary test calculation 2.
Figure 9:
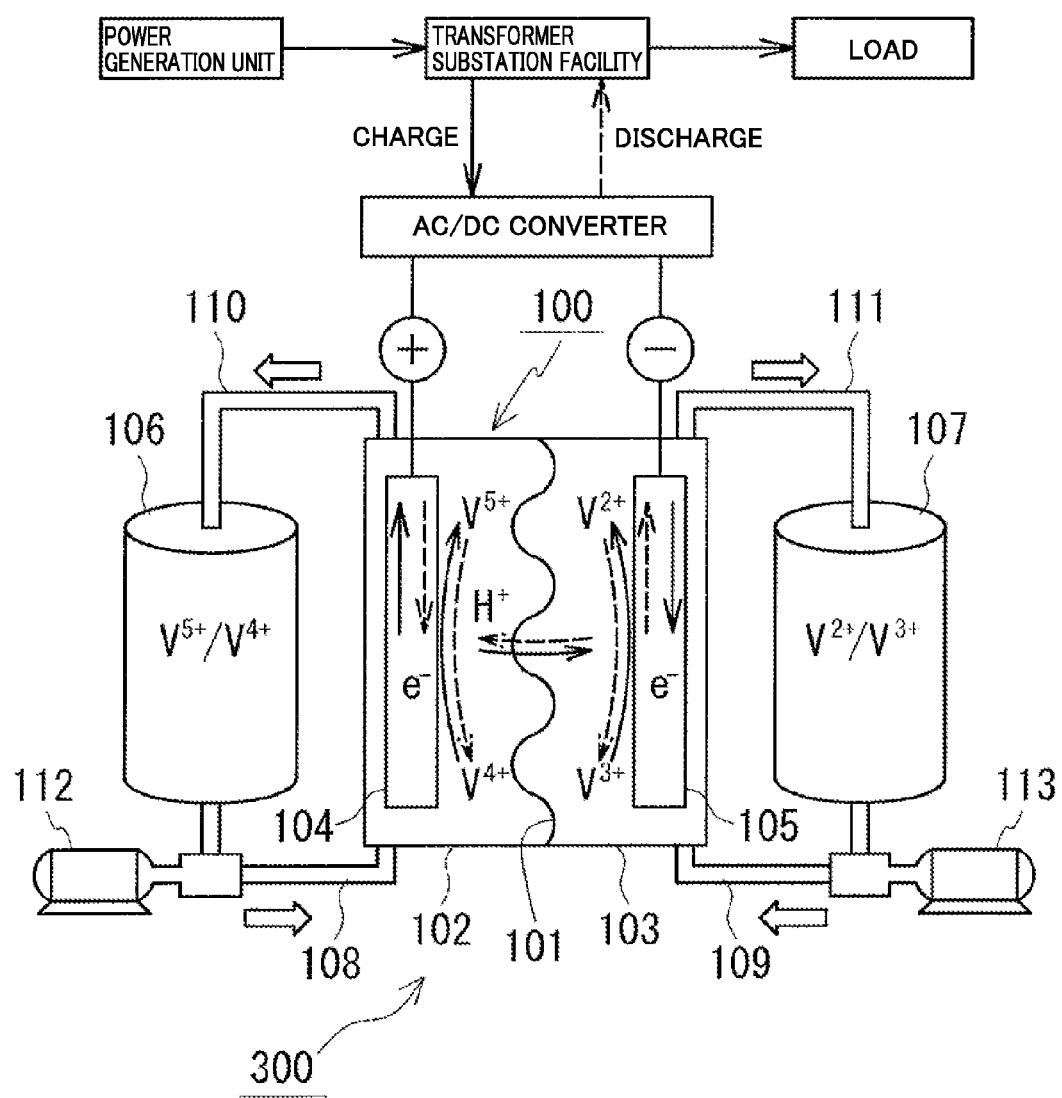
FIG. 9 shows a principle of an operation of a redox flow battery.

In an exemplary test calculation 2, a model of slit 210 which had bent portion 35 and connection portion 36 as shown in FIG. 8 was used to analyze and assess a flow adjustment effect and an amount of strain at connection portion 36 when length a of connection portion 36 was varied in a range of 1.0 mm to 300 mm. Slit 210 had bent portion 35 with a planar shape of ¼ of an arc (with a central angle θ=90 degrees) and radius of curvature r of 50 mm, and had connection portion 36 in the form of a straight line. Furthermore, slit 210 had a cross sectional shape in the form of a rectangle with depth h of 1 mm and width w of 4 mm.

(Flow Adjustment Effect)

The flow adjustment effect was assessed by a ratio of a centrifugal force acting on the electrolyte passing through bent portion 35 and the length of connection portion 36 (i.e., a degree of drift D, which will described later). Centrifugal force F acting on the electrolyte is obtained as follows:

(Centrifugal Force of Electrolyte)

Centrifugal force F ($N/m^3$) is calculated, with the electrolyte's specific gravity represented as m ($kg/m^3$) and the electrolyte's flow velocity represented as u (m/s), by the following expression:

$$F = m \times (u^2/r).$$ [Expression 10]

When the electrolyte's flow rate is Q (L/min), flow velocity u (m/s) is given by the following expression:

$$u = Q/(h \times w).$$ [Expression 11]

In the above expression, specific gravity m is assumed to be 1400 $kg/m^3$ and flow rate Q is assumed to be 1 L/min.

(Degree of Drift)

A ratio of centrifugal force F ($N/m^3$) acting on the electrolyte and length a (mm) of connection portion 36 is defined as degree of drift D, and degree of drift D ($N/m^4$) is calculated by the following expression:

$$D = F/a.$$ [Expression 12]

<Assessment of Flow Adjustment Effect>

Length a (mm) of connection portion 36 was varied in a range of 1.0 mm to 300 mm and degree of drift D ($N/m^4$) was calculated, and based thereon, a flow adjustment effect was assessed. A smaller degree of drift D means a higher flow adjustment effect. The flow adjustment effect was assessed as follows: "A" for degree of drift D having a value of $5.0 \times 10^7$ ($N/m^4$) or less; "B" for degree of drift D having a value of $1.0 \times 10^8$ ($N/m^4$) or less; and "C" otherwise. Values of degree of drift D and an assessment of the flow adjustment effect are shown in table 2.

(Amount of Strain)

The amount of strain was assessed by a total load P by a fluid pressure applied to connection portion 36's formation portion. Load P (N) at connection portion 36 is represented as a product of unit fluid pressure p (N/mm) and length a (mm) by the following expression:

$$P = p \times a.$$ [Expression 13]

Unit fluid pressure p (N/mm) is provided as a product of fluid pressure 6 (MPa) and the slit's depth h (mm) by σ×h, as done in exemplary test calculation 1. Note that fluid pressure σ is set to 0.5 MPa.

(Load)

By the following expression, load P (N) at connection portion 36 is calculated, and this load P is represented as $P_a$.

$$P = p \times a = \sigma \times h \times a$$ [Expression 14]

<Assessment of Amount of Strain>

Length a (mm) of connection portion 36 was varied in a range of 1.0 mm to 300 mm and load $P_a$ (N) was calculated, and based thereon, the amount of strain was assessed. Smaller load $P_a$ means a smaller amount of strain at the connection portion. The amount of strain was assessed as "A" for load $P_a$ having a value of 50 (N) or less, "B" for load $P_a$ having a value of 100 (N) or less, and "C" otherwise. Values of load $P_a$ and an assessment of the amount of strain are shown in table 2.

<Overall Assessment>

Connection portions having lengths shown in table 2 underwent an overall assessment based on an assessment of the flow adjustment effect and the amount of strain. The overall assessment is as follows: "A" when the flow adjustment effect and the amount of strain are both assessed as "A" (or there is no "B" or "C"); "B" when at least one of the flow adjustment effect and the amount of strain is assessed as "B" and there is no "C"; and "C" when at least one of the flow adjustment effect and the amount of strain is assessed as "C". A result thereof is shown in table 2.

TABLE 2

| length of connection portion | | a (mm) | | | | | |
|---|---|---|---|---|---|---|---|
| | | 1.0 | 5.0 | 10 | 50 | 200 | 300 |
| flow adjustment effect | D | $4.86 \times 10^8$ | $9.72 \times 10^7$ | $4.86 \times 10^7$ | $9.72 \times 10^6$ | $2.43 \times 10^6$ | $1.62 \times 10^6$ |
| | assessment | C | B | A | A | A | A |
| amount of strain | $P_a$ | 0.5 | 2.5 | 5 | 25 | 100 | 150 |
| | assessment | A | A | A | A | B | C |
| overall assessment | | C | B | A | A | B | C |

From the result of exemplary test calculation 2 shown in table 2, it can be seen that a connection portion having a larger length a allows degree of drift D to have a smaller value and hence allows a higher flow adjustment effect, and that a connection portion having a shorter length a allows load $P_a$ to have a smaller value and hence allows a smaller amount of strain. And when length a is 5.0 mm or more and 200 mm or less, it is believed that improvement of the flow adjustment effect and reduction in amount of strain can be coestablished. In particular, when length a is 10 mm or more and 50 mm or less, improvement of the flow adjustment effect and reduction in amount of strain can be coestablished at a high level.

[Exemplary Test Calculation 3]

A flow adjustment effect and an amount of strain when the slit was varied in depth, were assessed. Assessment conditions are indicated below.

In an exemplary test calculation 3, the FIG. 8 model used in exemplary test calculation 2 was used to analyze and assess a flow adjustment effect by connection portion 36 and an amount of strain at bent portion 35 when depth h of slit 210 was varied in a range of 0.1 mm to 15 mm. Slit 210 had bent portion 35 with a planar shape of ¼ of an arc (with a central angle θ=90 degrees) and radius of curvature r of 20 mm. Connection portion 36 was linear and had length a of 50 mm. Furthermore, slit 210 had a cross sectional shape in the form of a rectangle with width w of 4 mm.

<Assessment of Flow Adjustment Effect>

The flow adjustment effect was assessed as follows: the expression described for exemplary test calculation 2 was used to calculate degree of drift D (N/m⁴) with the slit's depth h varied in a range of 0.1 mm to 15 mm, and based thereon, the flow adjustment effect was assessed. The flow adjustment effect was assessed as follows: "A" for degree of drift D having a value of $5.0 \times 10^7$ (N/m⁴) or less; "B" for degree of drift D having a value of $1.0 \times 10^8$ (N/m⁴) or less; and "C" otherwise. Values of degree of drift D and an assessment of the flow adjustment effect are shown in table 3.

<Assessment of Amount of Strain>

The amount of strain was assessed as follows: The expression described for exemplary test calculation 1 was used to calculate load $P_r$ (N) with the slit's depth h varied in a range of 0.1 mm to 15 mm, and based thereon, the amount of strain was assessed. The amount of strain was assessed as "A" for load $P_r$ having a value of 50 (N) or less, "B" for load $P_r$ having a value of 100 (N) or less, and "C" otherwise. Values of load $P_r$ and an assessment of the amount of strain are shown in table 3.

<Overall Assessment>

Slits having depths shown in table 3 underwent an overall assessment based on an assessment of the flow adjustment effect and the amount of strain. The overall assessment is as follows: "A" when the flow adjustment effect and the amount of strain are both assessed as "A" (or there is no "B" or "C"); "B" when at least one of the flow adjustment effect and the amount of strain is assessed as "B" and there is no "C"; and "C" when at least one of the flow adjustment effect and the amount of strain is assessed as "C". A result thereof is shown in table 3.

TABLE 3

| depth of slit | | h (mm) | | | | | |
|---|---|---|---|---|---|---|---|
| | | 0.1 | 0.5 | 1.0 | 5.0 | 10 | 15 |
| flow adjustment effect | D | $2.43 \times 10^9$ | $9.72 \times 10^7$ | $2.43 \times 10^7$ | $9.72 \times 10^5$ | $2.43 \times 10^5$ | $1.08 \times 10^5$ |
| | assessment | C | B | A | A | A | A |
| amount of strain | $P_r$ | 1 | 5 | 10 | 50 | 100 | 150 |
| | assessment | A | A | A | A | B | C |
| overall assessment | | C | B | A | A | B | C |

From the result of exemplary test calculation 3 shown in table 3, it can be seen that a slit having a larger depth h allows degree of drift D to have a smaller value and hence allows a higher flow adjustment effect, and that a slit having a smaller depth h allows load $P_r$ to have a smaller value and hence allows a smaller amount of strain. And when depth h is 0.5 mm or more and 10 mm or less, it is believed that improvement of the flow adjustment effect and reduction in amount of strain can be coestablished. In particular, when depth h is 1.0 mm or more and 5.0 mm or less, improvement of the flow adjustment effect and reduction in amount of strain can be coestablished at a high level.

[Exemplary Test Calculation 4]

A flow adjustment effect and heat dissipation performance when the slit was varied in width, were assessed. Assessment conditions are indicated below.

In an exemplary test calculation 4, the FIG. 8 model used in exemplary test calculation 2 was used to analyze and assess a flow adjustment effect by connection portion 36 and heat dissipation performance at bent portion 35 when slit 210 was varied in width in a range of 0.1 mm to 25 mm. Slit 210 had bent portion 35 with a planar shape of ¼ of an arc (with a central angle θ=90 degrees) and radius of curvature r of 10 mm. Connection portion 36 was linear and had length a of 100 mm. Furthermore, slit 210 had a cross sectional shape in the form of a rectangle with depth h of 1 mm.

<Assessment of Flow Adjustment Effect>

The flow adjustment effect was assessed as follows: the expression described for exemplary test calculation 2 was used to calculate degree of drift D (N/m⁴) with the slit's width w varied in a range of 0.1 mm to 25 mm, and based thereon, the flow adjustment effect was assessed. The flow adjustment effect was assessed as follows: "A" for degree of drift D having a value of $5.0 \times 10^8$ (N/m⁴) or less; "B" for degree of drift D having a value of $1.0 \times 10^{10}$ (N/m⁴) or less; and "C" otherwise. Values of degree of drift D and an assessment of the flow adjustment effect are shown in table 4.

<Assessment of Heat Dissipation Performance>

Heat dissipation performance was assessed as follows: The expression described for exemplary test calculation 1 was used to calculate temperature increase rate ΔT (° C./s) with the slit's width w varied in a range of 0.1 mm to 25 mm, and based thereon, heat dissipation performance was assessed. Heat dissipation performance was assessed as "A" for temperature increase rate ΔT having a value of 5.0 (° C./s) or less, "B" for temperature increase rate ΔT having a value of 8.0 (° C./s) or less, and "C" otherwise. Values of temperature increase rate ΔT and an assessment of heat dissipation performance are shown in table 4.

<Overall Assessment>

Slits having widths shown in table 4 underwent an overall assessment based on an assessment of the flow adjustment effect and heat dissipation performance. The overall assessment is as follows: "A" when the flow adjustment effect and heat dissipation performance are both assessed as "A" (or there is no "B" or "C"); "B" when at least one of the flow adjustment effect and heat dissipation performance is assessed as "B" and there is no "C"; and "C" when at least one of the flow adjustment effect and heat dissipation performance is assessed as "C". A result thereof is shown in table 4.

TABLE 4

| width of slit | | w (mm) | | | | | |
|---|---|---|---|---|---|---|---|
| | | 0.1 | 0.5 | 1.0 | 8.0 | 20 | 25 |
| flow adjustment effect | D | $3.89 \times 10^{10}$ | $1.56 \times 10^{9}$ | $3.89 \times 10^{8}$ | $6.08 \times 10^{6}$ | $9.72 \times 10^{5}$ | $6.22 \times 10^{5}$ |
| | assessment | C | B | A | A | A | A |
| heat dissipation performance | ΔT | 0.040 | 0.199 | 0.398 | 3.186 | 7.965 | 9.957 |
| | assessment | A | A | A | A | B | C |
| overall assessment | | C | B | A | A | B | C |

From the result of exemplary test calculation 4 shown in table 4, it can be seen that a slit having a larger width w allows degree of drift D to have a smaller value and hence allows a higher flow adjustment effect, and that a slit having a smaller width w allows temperature increase rate ΔT to have a smaller value and hence allows higher heat dissipation performance. And when width w is 0.5 mm or more and 20 mm or less, it is believed that improvement of the flow adjustment effect and improvement in heat dissipation can be coestablished. In particular, when width w is 1.0 mm or more and 8.0 mm or less, improvement of the flow adjustment effect and improvement in heat dissipation can be coestablished at a high level.

INDUSTRIAL APPLICABILITY

The frame body and cell frame of the present invention are suitably applicable to a component of a redox flow battery.

REFERENCE SIGNS LIST

100: cell
101: ion exchange membrane
102: positive electrode cell; 104: positive electrode
103: negative electrode cell; 105: negative electrode
106: tank for positive electrode electrolyte
108, 110: conduit; 112: pump
107: tank for negative electrode electrolyte
109, 111: conduit; 113: pump
20: cell frame
21: bipolar plate; 22: frame body
22L: long piece; 22S: short piece; 22C: corner
22o: opening
24: chamber
200: manifold
201, 202: liquid supply manifold
203, 204: liquid drainage manifold
210: slit
211, 212: liquid supply slit
213, 214: liquid drainage slit
35, 35a-35c: bent portion
36: connection portion
40: protective plate
50: seal member
10S: cell stack
250: end plate
300: redox flow battery (RF battery)

The invention claimed is:

1. A frame body used for a cell of a redox flow battery, comprising: a rectangular opening formed inside the frame body;
   a manifold through which an electrolyte circulates; and
   a slit connected between the rectangular opening and the manifold, the slit forming a channel for the electrolyte between the rectangular opening and the manifold,
   the slit having at least one bent portion, whose radius of curvature is equal to or greater than 2.0 mm and is smaller than or equal to 200 mm, wherein
   the slit has a connection portion having a radius of curvature more than 200 mm between the bent portion that is the closest to the rectangular opening and the rectangular opening, and the connection portion has a length of 5.0 mm or more and 200 mm or less.

2. The frame body according to claim 1, wherein the slit has a depth of 0.5 mm or more and 10 mm or less.

3. The frame body according to claim 1, wherein the slit has a width of 0.5 mm or more and 20 mm or less.

4. The frame body according to claim 1, having a pair of first pieces opposite to each other and a pair of second pieces which connect the first pieces at their ends, the first pieces being longer than the second pieces, wherein one of the first pieces is provided with the at least one bent portion.

5. The frame body according to claim 1, having a pair of first pieces opposite to each other and a pair of second pieces which connect the first pieces at their ends, the first pieces being longer than the second pieces, wherein a corner formed by one of the first pieces and one of the second pieces has the at least one bent portion.

6. A cell frame for a redox flow battery, comprising:
   the frame body according to claim 1; and
   a bipolar plate fitted in the opening of the frame body, the frame body and the bipolar plate forming a chamber inside the frame body.

7. A redox flow battery comprising a cell frame for a redox flow battery according to claim 6.

* * * * *